UNITED STATES PATENT OFFICE 2,535,664

PLASTICIZING SYNTHETIC RUBBER

David J. Beaver, St. Albans, and Monte C. Throdahl, Nitro, W. Va., assignors to Monsanto Chemical Company, St. Louis, Mo., a corporation of Delaware No Drawing. Application August 9, 1945, Serial No. 609,924

10 Claims. (Cl. 260—30.4)

This invention relates to a new class of plasticizers for synthetic rubber and to the synthetic rubber compositions obtained by the use of such plasticizers.

In contrast to natural rubber, synthetic rubber is highly resistant to breakdown to a soft, pliable plastic condition by mastication. The synthetic products are hard and dry and therefore difficult to mill and compound. The addition of plasticizing or softening agents is therefore necessary but the search for suitable agents is complicated by the difference in properties between various synthetic rubbers and the difference of all synthetic rubbers from natural rubber. Many of the softening agents for natural rubber are either incompatible with synthetic rubber or, if compatible, are ineffective. Furthermore, softeners for one type of synthetic rubber may not be softeners for another type and some otherwise effective agents adversely affect the physical properties of the cured products so that they cannot be used at all.

The new softening agents are compatible with any of the synthetic rubbers prepared by the polymerization of a butadiene-1,3 hydrocarbon and may be used in any proportion required to give the properties sought. They do not interfere with the subsequent curing of the rubbery compositions. On the contrary, vulcanized synthetic rubber products of high modulus, tensile and elongation are obtained even in the presence of relatively large amounts of plasticizer.

In accordance with the present invention it has been discovered that gamma lactones are valuable plasticizing and softening agents for synthetic rubbers prepared by the polymerization of butadiene-1,3 hydrocarbons, either alone or in admixture with other polymerizable materials. These compounds may be regarded as substituted butyrolactones, the parent substance having the formula

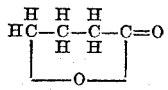

Typical examples of lactones which may be used in the practice of this invention comprise: gamma valerolactone; isocaprolactone; gamma ethyl butyrolactone; gamma n-caprolactone; alpha ethyl butyrolactone; beta, gamma dimethyl butyrolactone; alpha, alpha dimethyl butyrolactone; beta, beta dimethyl butyrolactone; gamma decyl butyrolactone; gamma tetradecyl butyrolactone; gamma n-propyl butyrolactone; gamma isopropyl butyrolactone; gamma isobutyl butyrolactone; alpha isopropyl, gamma methyl butyrolactone; alpha, gamma, gamma trimethyl butyrolactone; alpha ethyl, gamma methyl butyrolactone and gamma amyl butyrolactone.

The synthetic rubbers which may be plasticized and softened by the gamma lactones are polymers of butadiene-1,3 and its homologues, as for example isoprene, 2,3 dimethyl butadiene, piperylene and the like, either alone or with other unsaturated compounds copolymerizable therewith. Examples of copolymerizable compounds comprise styrene, vinyl naphthalene, vinylbiphenyl alpha methyl styrene, acrylonitrile, methacrylonitrile, methyl vinyl ketone and other products which contain the polymerizable structure

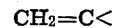

Polymerization may be conducted by any of the methods known to the art as for example polymerization in aqueous emulsion.

The amount of plasticizer added will of course depend upon the particular synthetic rubber being treated and the properties desired in the final product. In general, 10-30 parts by weight of plasticizer for each 100 parts by weight of synthetic rubber will be satisfactory for most purposes, however, amounts outside this range may be used where desired. In general, useful improvements may be effected with 1-100 parts by weight of gamma lactone per 100 parts by weight of synthetic rubber. Lower amounts are satisfactory with the butadiene-styrene copolymer than with the butadiene-acrylic nitrile copolymer.

The gamma lactones may be prepared by a variety of methods. For example butyrolactone has been prepared by the distillation of gamma chlorobutyric acid, by treating gamma phenyl hydroxy butyric acid with hydrobromic acid and by allowing sodium amalgam and glacial acetic acid to act on succinyl chloride in ethereal solution and by other methods. Gamma valerolactone may be prepared by reduction of laevulinic acid or by boiling allyl acetic acid with dilute sulfuric acid. Stearolactone, probably gamma tetradecyl butyrolactone, is formed by heating oleic acid with zinc chloride or by reduction of gamma ketostearic acid. This invention is not concerned with the preparation of the lactones but pertains to their use as plasticizers regardless of the method of their preparation.

As specific embodiments of the invention illustrating the invention but not limiting it, a gamma lactone was added to a copolymer of butadiene-1,3 and acrylic nitrile known commercially as Hycar OR-15. Vulcanizable stocks were prepared containing the following ingredients:

| | Parts by weight |
|---|---|
| Butadiene-acrylic nitrile copolymer | 100 |
| Carbon black | 50 |
| Lead oxide (PbO) | 2.5 |
| Zinc diethyl dithiocarbamate | 2.5 |
| Tetra methyl thiuram disulfide | 2.5 |
| Plasticizer | 20 |

The resistance of the stocks to shearing stress was determined by means of a Mooney plastometer (Melvin Mooney, Ind. and Eng. Chem. Analytical Ed., Mar. 15, 1934, pp. 147–151) and their resistance to extrusion was determined on a Firestone plastometer (J. H. Dillon, Rubber Chemistry and Technology, vol. 9, pp. 496–501, 1936). The stocks were cured in the usual manner by heating for sixty minutes in a press at 150° C. and the tensile properties of the cured products determined. The physical test data is set forth in the table below.

| Plasticizer | Plasticity | | Tensile, lbs./in.² | Ultimate Elongation, Per Cent |
|---|---|---|---|---|
| | Shear | Extrusion | | |
| None | 45 | 95 | 2,580 | 565 |
| Gamma valerolactone | 20 | 6 | 2,350 | 700 |
| Butyrolactone | 22 | 8 | 2,470 | 740 |
| Keto-pimelic acid dilactone | 17 | 15 | 2,460 | 800 |

The addition of 5 parts by weight of gamma valerolactone to a stock containing the copolymer of butadiene-1,3 and styrene (GR–S) lowered the resistance to shearing stress without altering the physical properties of the cured rubber product. The modulus, tensile and elongation were equivalent to a control stock containing no valerolactone.

Other lactones than those mentioned may be added to synthetic rubbers. However, saturated lactones are preferred. The presence of unsaturated groups does not materially alter the plasticizing effect, but may affect the properties of the cured product deleteriously.

Other ingredients such as natural rubber, other plasticizers, fillers, pigments, vulcanizing agents, antioxidants, accelerators and compounding ingredients than those mentioned may be used to prepare synthetic rubber compositions of various types. Many modifications will be apparent to those skilled in the art. The invention is limited solely by the claims attached hereto as part of the present specification.

What is claimed is:

1. A composition of matter comprising a synthetic rubber prepared by the polymerization of a butadiene-1,3 hydrocarbon and, as a plasticizer therefor, an alkyl gamma lactone in the proportion within the range of 1–100 parts by weight per 100 parts by weight of synthetic rubber.

2. A composition of matter comprising a synthetic rubber prepared by the copolymerization of a butadiene-1,3 hydrocarbon and an unsaturated mono olefinic compound which contains a $$CH_2=C<$$

group and is copolymerizable therewith and, as a plasticizer therefor, an alkyl gamma lactone in the proportion within the range of 1–100 parts by weight per 100 parts by weight of synthetic rubber.

3. A composition of matter comprising a synthetic rubber prepared by the copolymerization of a butadiene-1,3 hydrocarbon and an unsaturated mono olefinic compound which contains a $$CH_2=C<$$

group and is copolymerizable therewith and, as a plasticizer therefor, an alkyl substituted gamma butyrolactone in the proportion within the range of 1–100 parts by weight per 100 parts by weight of synthetic rubber.

4. A composition of matter comprising a synthetic rubber prepared by the copolymerization of a butadiene-1,3 hydrocarbon and an unsaturated mono olefinic compound which contains a $$CH_2=C<$$

group and is copolymerizable therewith and, as a plasticizer therefor, a lactone of the structure $$R-\overset{H}{\underset{\underline{\qquad O \qquad}}{C}}-CH_2-CH_2-C=O$$

where R is an alkyl group in the proportion within the range of 1–100 parts by weight per 100 parts by weight of synthetic rubber.

5. A composition of matter comprising a synthetic rubber prepared by copolymerizing butadiene-1,3 and crylonitrile and, as a plasticizer therefor, an alkyl gamma lactone in the proportion within the range of 1–100 parts by weight per 100 parts by weight of synthetic rubber.

6. A composition of matter comprising a synthetic rubber prepared by copolymerizing butadiene-1,3 and acrylonitrile and, as a plasticizer therefor, an alkyl substituted gamma butyrolactone in the proportion within the range of 1–100 parts by weight per 100 parts by weight of synthetic rubber.

7. A composition of matter comprising a synthetic rubber prepared by copolymerizing butadiene-1,3 and acrylonitrile and, as a plasticizer therefor, a lactone of the structure $$R-\overset{H}{\underset{\underline{\qquad O \qquad}}{C}}-CH_2-CH_2-C=O$$

where R is an alkyl group in the proportion within the range of 1–100 parts by weight per 100 parts by weight of synthetic rubber.

8. A composition of matter comprising a synthetic rubber prepared by copolymerizing butadiene-1,3 and acrylonitrile and, as a plasticizer therefor, gamma valerolactone in the proportion within the range of 1–100 parts by weight per 100 parts by weight of synthetic rubber.

9. A composition of matter comprising a synthetic rubber prepared by copolymerizing butadiene-1,3 and acrylonitrile and, as a plasticizer therefor, gamma stearolactone in the proportion within the range of 1–100 parts by weight per 100 parts by weight of synthetic rubber.

10. A composition of matter comprising a synthetic rubber prepared by copolymerizing butadiene-1,3 and acrylonitrile and, as a plasticizer therefor, gamma butyrolactone in the proportion within the range of 1–100 parts by weight per 100 parts by weight of synthetic rubber.

DAVID J. BEAVER.
MONTE C. THRODAHL.

REFERENCES CITED

The following references are of record in the file of this patent:

FOREIGN PATENTS

| Number | Country | Date |
|---|---|---|
| 340,008 | Great Britain | Dec. 19, 1930 |
| 883,764 | France | July 16, 1943 |

OTHER REFERENCES

Stocklin, Trans. Inst. Rubber Industry, vol. 15 (June 1939), page 58.

India Rubber World, vol. III, November 1944 (page 221).